Patented July 5, 1949

2,475,470

UNITED STATES PATENT OFFICE 2,475,470

CERAMIC COATING MATERIAL

Dwight G. Bennett and Clifford M. Andrews, Champaign, Ill.

No Drawing. Application November 13, 1945, Serial No. 628,360

3 Claims. (Cl. 106—48)

This invention relates to a ceramic coating material which is adapted to control the absorption, reflection, emission and conduction of radiant energy at high temperatures.

It has been found desirable, particularly in the case of military aircraft, to reduce both the visible and infra red radiations emanating from the hot metal parts of the exhaust system so as to avoid detection of the presence and whereabouts of the aircraft by the enemy. The present type of coating was developed with a view to satisfying this desideratum and also for the purpose of protecting the metal parts of the exhaust system from the hot and corrosive gases discharged from the engine. In addition, the coating has been provided with the qualities of good adherence to a previously applied base coat and a sufficiently high coefficient of expansion to prevent spalling of the coating upon expansion and contraction of the metal due to the heating and cooling thereof.

Accordingly, it is an object of the present invention to provide a ceramic coating material which will greatly reduce the emission of both visible and infra red radiations from a hot body coated with this material.

It is another object of the present invention to provide a ceramic coating material which will protect the metal over which the coating is applied from thermal oxidation and also from hot and corrosive gases coming into contact therewith.

It is a further object of the invention to provide a ceramic coating for metals which possesses a coefficient of expansion comparable to that of the metal and which will retain this coefficient of expansion after long heating at high temperatures.

Still a further object of the invention resides in the provision of a ceramic coating material for metals which is adapted to be used over a previously applied ceramic base coat and which will resist flaking and cracking upon deformation of the metal so coated and which will also resist spalling when subjected to thermal shock.

The coating composition comprising the present invention consists of a frit which contains a relatively large amount of calcium oxide which is added in the form of whiting so as to produce a bonding glass which will resist softening or fusion until a temperature of from 1800° F to 1900° F. is reached after which it melts quite rapidly and becomes very fluid. The frit also is formulated with an initially high flux content in order to produce a glass having an initially high coefficient of expansion so as to prevent spalling of the coating during the heating and cooling of the metal to which it is applied. In addition, a small quantity of vanadium oxide is introduced into the frit for the purpose of reducing the emission of radiant energy from the coating when heated to high temperatures. It has been found that this ingredient has valuable glow suppressive properties when added to the frit and it is therefore advantageous to use this material in coatings which are intended to suppress the radiation of visible and infra red radiations.

The mill addition used in connection with this frit for producing a heat resistive and glow suppressive coating may take either one of two forms. It has been found that diaspore is effective in suppressing approximately 65% of the radiations emanating from the hot metal within the range of from 3,000 to 12,000 angstrom units and has the further desirable property of remaining effective for this purpose after extended heating at high temperatures. It has been found that this refractory has less tendency to go into solution with the frit than most other refractory materials. This, of course, is a desirable property since any of the refractory which does go into solution with the frit will tend to alter the coefficient of expansion of the coating and also reduce its glow suppressive properties as the result of the formation of a glassy matrix. A second very desirable material for use as a mill addition is a low ferric oxide content, basic magnesium carbonate calcined at cone 12 in a ceramic kiln. This material has been found to be somewhat more suppressive in the radiation band of from 3,000 to 12,000 angstrom units than diaspore and it also has the ability to retain this property over long periods of heating at temperatures up to 1600° F. Furthermore, its coefficient of expansion is close to that for iron, and as long as no appreciable amount of this material goes into solution with the frit it will have very little effect upon the coefficient of expansion of the coating.

Either type of coating, that is, either the diaspore type or the magnesia type, may be used with any high temperature type of base coat which has a coefficient of expansion equal to that of #1020 steel or higher. However, it is recommended that for maximum performance, the top coats herein described be used over the base coats fully described in our copending application Ser. No. 628,359, filed November 13, 1945, and entitled "Ceramic coating for metals." It has been found that the top coats forming the subject matter of the present invention, when applied over the base coats described in the application mentioned above, will produce a coating having superior glow suppression qualities and at the same time afford excellent protection to the metal up to temperatures of 1600° F.

The composition of the frit for the present top coats is as follows:

Frit

| | Parts by weight |
|---|---|
| Feldspar | 33.8 |
| Borax | 8.9 |
| Soda ash | 15.9 |
| Soda niter | 4.0 |
| Granular aluminum oxide | 3.7 |
| Sodium silico-fluoride | 4.0 |
| Barium carbonate | 10.4 |
| Zinc oxide | 8.9 |
| Whiting | 7.7 |
| Vanadium oxide (91.25%) | 2.7 |
| | 100.0 |

This frit may be prepared in the conventional manner; that is, the various materials are weighed out in the amounts indicated in the above formula, then mixed together and screened through a 20-mesh sieve. The sieved material is then thoroughly mixed and smelted to quiet fusion. The melt is then quenched in cold water and dried and the frit is ready for use.

The diaspore and magnesia types of coatings are prepared by milling either the diaspore or the magnesia with the above frit in order to produce a slip for either type of coating. The mill batches for the two types of coatings are set out below, the mill batch for the diaspore type of coating being designated as "A" and the mill batch for the magnesia type of coating being designated as "B."

Mill batch "A"

| | Parts by weight |
|---|---|
| Frit | 35 |
| Diaspore (first grade) | 65 |
| Water | 50 |

Mill batch "B"

| | |
|---|---|
| Frit | 60 |
| Magnesia (cone 12) | 40 |
| Clay | 7 |
| Water | 50 |

Mill batch "A" may be prepared by measuring out the proper amounts of frit, diaspore and water and placing them together in a ball mill for grinding. The batch is ground in the mill until a 2 to 4 gram dry residue remains on a 200-mesh screen from a 100 gram sample of the slip. The consistency of the slip may, of course, be adjusted by the addition of any of the well-known electrolytes in a manner well-known to the art.

Mill batch "B" may be prepared by measuring out the proper amounts of frit, magnesia, clay and water and grinding them together in a ball mill in the following manner: The mill batch should be ground without the magnesia and with only one-half of the total water content until no more than a 1 gram dry residue remains on a 200-mesh screen from a 100 gram sample. The magnesia should be prepared by calcining the magnesite at cone 12 after which it should be ground to pass through a 60-mesh screen, though excessive fines of the magnesia are to be avoided. The magnesia thus prepared and the remainder of the water are then added to the mill and the entire batch ground until a 1 to 2 gram dry residue remains on a 200-mesh screen from the 100 gram sample of slip.

In order to obtain the best radiation suppressive qualities, it has been found that a magnesia containing approximately .3% or less of ferric oxide is desirable since a magnesia containing larger amounts of this oxide will result in a coating of inferior radiation suppressive qualities. Either type of the coating, that is, either the diaspore type or the magnesia type may be applied to the metal by dipping or spraying to a fired thickness of from 8 to 10 mils. The coatings should be dried according to standard practice and then fired at approximately 1650° F. for a period of from 5 to 15 minutes, depending upon the thickness of the metal.

In connection with the development of the magnesia type of top coat, a study was made of the various types of magnesia. That formed by calcining basic magnesium carbonate at cone 12 in a ceramic kiln proved to be the best. It has been found that hard sintering of the magnesia to the dead burned state tends to reduce the suppressive properties of the coating, while calcining the material to a lesser degree produces a magnesia which will react with water to form a slip which will thicken and harden within a very short time. Hence, while the water reacting or caustic magnesia has been found to produce an effective coating for suppressing radiations, it must be used within a short time after milling and, for that reason, is generally undesirable.

It has further been found that with the magnesia type of coating, the emission of visible and infra red rays will be reduced rather sharply with initial increments of coating thickness and then more slowly as the thickness of the coating is increased. In other words, with increasing thickness, the decrease in emissivity is slow, while with decreasing thickness, the increase in emissivity is rapid. The optimum coating thickness has been found to be approximately 8 mils.

The presently described types of top coats may be used in conjunction with the base coats described in our aforementioned copending patent application on practically any type of iron or steel, although it has been found that ordinary enameling iron or ingot iron is unsatisfactory for use where extended heating at high temperatures is involved. This type of iron is very low in carbon content and it has been found, upon extended heating tests, that the iron tends to embrittle after being heated for 16 hours at 1600° F. This embrittlement is very pronounced and the iron can be readily fractured, thus rendering it unsuitable for use where mechanical strains and shocks are likely to be encountered.

It was further found that a low carbon steel such as #1020 will withstand extended heating at elevated temperatures without becoming brittle due to the fact that this steel has an appreciable carbon content which has been found to prevent embrittlement. While the steel contains a considerably larger percentage of impurities than enameling iron and therefore will not coat quite as readily as the latter, it will be found that no serious difficulties will be encountered when coating this type of steel. As for alloy steels having a high coefficient of expansion, it will be found that the high expansion type of base coat mentioned in our copending application will adhere very well to these high expansion alloys and either of the top coats described herein may be applied over this base coat without encountering any difficulty from spalling or cracking. This is due to the high coefficient of expansion of the frit used in compounding the present types of top coats. This frit will be found to have a calculated coefficient of expansion of $418 \times 10^{-7}$ which adapts it very well for use in connection with high expansion alloy metals.

The top coats described herein have the further desirable feature of tending to insulate the metal from the heat of the gases from the engine and it has been found that at temperatures in the neighborhood of 1600° F., a 250° temperature differential will exist in a coating having a thickness of 11 or 12 mils. This feature may be used to advantage in aircraft installations where a saving in weight is of great importance, since by the use of these coatings a lighter gauge metal can be used in the fabrication of the exhaust conduits without encountering deformation of the metal as a result of the high temperatures encountered.

Both the diaspore and magnesia types of coatings will withstand numerous cycles of thermal shock without spalling or cracking of the coat. This feature is, of course, of considerable importance where the coating is to be used in engine exhaust disposal systems which are heated to high temperatures and allowed to cool down to atmospheric temperatures a number of times during the life of the engine.

Having thus described the essential features of our invention and having fully defined the composition of the ceramic coating material invented by us which, of course, may be modified or altered in non-essential particulars without departing from the spirit of our invention, we claim:

1. A heat resisting coating composition for protecting metals against the effects of extended heating and temperatures up to 1600° F. and for suppressing the emission of visibility of infra-red radiation therefrom, said coating composition characterized by high resistance to thermal shock and good adherence to the metal comprising a fused enamel frit and a refractory mill addition, 100 parts of the raw frit batch including approximately 33.8 parts by weight of feldspar, 8.9 parts of borax, 15.9 parts of soda ash, 4.0 parts of soda niter, 3.7 parts of granular aluminum oxide, 4.0 parts of sodium silico-fluoride, 10.4 parts of barium carbonate, 8.9 parts of zinc oxide, 7.7 parts of whiting and 2.7 parts of vanadium oxide, and a mill addition including approximately 35 parts of the fused frit, 65 parts of first-grade diaspore and 50 parts of water.

2. A heat-resistant coating composition for protecting metals against the effects of extended heating at temperatures up to 1600° F. and for suppressing the emission of visible and infra-red radiations therefrom the coating composition being characterized by resistance to thermal shock and good adherence to metal, said composition comprising a fused enamel frit and a refractory mill addition, the raw frit batch including approximately 33.8 parts by weight of feldspar, 8.9 parts of borax, 15.9 parts of soda ash, 4.0 parts of soda niter, 3.7 parts of granular aluminum oxide, 4.0 parts of sodium silicofluoride, 10.4 parts of barium carbonate, 8.9 parts of zinc oxide, 7.7 parts of whiting and 2.7 parts of vanadium oxide, the mill addition containing out of a total of about 150 parts by weight, fifty parts of water and from forty to sixty-five parts of a refractory material selected from the group consisting of first grade diaspore and magnesia calcined to cone 12 and containing less than 1% ferric oxide as impurity, the proportions being 65 parts diaspore to 35 parts frit when diaspore is used and 40 parts magnesia to 60 parts frit when magnesia is used.

3. A heat-resisting coating composition for protecting metals against the effects of extended heating and temperatures up to 1600° F. and for suppressing the emission of visibility of infra-red radiation therefrom, said coating composition characterized by high resistance to thermal shock and good adherence to the metal, comprising a fused enamel frit and a refractory mill addition, 100 parts of the raw frit batch including approximately 33.8 parts by weight of feldspar, 8.9 parts of borax, 15.9 parts of soda ash, 4.0 parts of soda niter, 3.7 parts of granular aluminum oxide, 4.0 parts of sodium silicofluoride, 10.4 parts of barium carbonate, 8.9 parts of zinc oxide, 7.7 parts of whiting and 2.7 parts of vanadium oxide, the mill addition including approximately 60 parts of the fused frit, 40 parts of magnesia calcined to cone 12 and containing less than 1% of ferric oxide as impurity, 7 parts of clay and 50 parts of water.

DWIGHT G. BENNETT.
CLIFFORD M. ANDREWS.

REFERENCES CITED

The following references are of record in the file of this patent:

UNITED STATES PATENTS

| Number | Name | Date |
|---|---|---|
| 691,268 | Jankowsky | Jan. 14, 1902 |
| 1,833,087 | Migeot | Nov. 24, 1931 |
| 2,043,559 | Rosenberg | June 9, 1936 |
| 2,300,454 | Lucas | Nov. 3, 1942 |
| 2,326,348 | Frost et al. | Aug. 10, 1943 |
| 2,339,260 | Frost et al. | Jan. 18, 1944 |
| 2,391,468 | Long | Dec. 25, 1945 |
| 2,396,979 | Baldwin | Mar. 19, 1946 |

OTHER REFERENCES

Ser. No. 335,627, Paquet (A. P. C.), published June 1, 1943.